(12) United States Patent
Lai

(10) Patent No.: US 8,269,364 B2
(45) Date of Patent: Sep. 18, 2012

(54) TIDAL POWER GENERATOR

(75) Inventor: Jin-Shi Lai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 583 days.

(21) Appl. No.: 12/543,512

(22) Filed: Aug. 19, 2009

(65) Prior Publication Data

US 2011/0012357 A1 Jan. 20, 2011

(30) Foreign Application Priority Data

Jul. 15, 2009 (CN) .......................... 2009 1 0304376

(51) Int. Cl.
*F03B 13/12* (2006.01)
(52) U.S. Cl. .......................... 290/53; 290/42
(58) Field of Classification Search .................. 290/42, 290/43, 53, 54, 44, 55; 417/333, 330; 60/398
See application file for complete search history.

(56) References Cited

U.S. PATENT DOCUMENTS

| | | | | |
|---|---|---|---|---|
| 4,271,668 A * | 6/1981 | McCormick | | 60/398 |
| 4,286,347 A * | 9/1981 | Modisette | | 60/398 |
| 4,441,316 A * | 4/1984 | Moody | | 60/398 |
| 4,719,754 A * | 1/1988 | Nishikawa | | 60/501 |
| 5,005,357 A * | 4/1991 | Fox | | 60/398 |
| 5,186,822 A * | 2/1993 | Tzong et al. | | 210/122 |
| 5,374,850 A * | 12/1994 | Cowen | | 290/53 |
| 5,770,893 A * | 6/1998 | Youlton | | 290/53 |
| 5,872,406 A * | 2/1999 | Ullman et al. | | 290/53 |
| 6,216,455 B1 * | 4/2001 | Doleh et al. | | 60/398 |
| 6,800,954 B1 * | 10/2004 | Meano | | 290/53 |
| 6,849,963 B2 * | 2/2005 | Grinsted et al. | | 290/42 |
| 7,078,827 B2 * | 7/2006 | Brewington | | 290/53 |
| 7,511,386 B2 * | 3/2009 | Lin | | 290/53 |
| 7,737,572 B2 * | 6/2010 | Welch et al. | | 290/53 |
| 7,830,032 B1 * | 11/2010 | Breen | | 290/53 |
| 7,980,832 B2 * | 7/2011 | Ahdoot | | 417/333 |

FOREIGN PATENT DOCUMENTS

CN 2483520 Y 3/2002

* cited by examiner

*Primary Examiner* — Nicholas Ponomarenko
(74) *Attorney, Agent, or Firm* — Altis Law Group, Inc.

(57) ABSTRACT

The tidal power generator includes a hollow container, an impeller designed for unidirectional rotation, an electric generator fixed in the container, and a chargeable power source. A first opening and an opposite second opening are defined in the container. The impeller is positioned at the second opening and configured for unidirectionally rotating pushed by air flow. The electric generator includes a stator and a rotor extending from the stator. The rotor is fixedly connected to the impeller. The rotor rotates with rotation of the impeller so that the stator outputs electrical energy. The power source is configured for storing the output electrical energy.

7 Claims, 4 Drawing Sheets

TIDAL POWER GENERATOR

BACKGROUND

1. Technical Field

The present disclosure relates to power generation technologies and, particularly, to a tidal power generator.

2. Description of Related Art

Generally, many power generators consume fossil fuels, such as coal, oil, or natural gas. The burning of such fuels produces harmful emissions that are both difficult and expensive to either contain, or remove, from the exhaust gasses. In addition, most sources of fossil fuels are non-renewable resources and will be exhausted in the nearly future. As a result, solar energy and wind energy are proposed to generate electricity instead. However, solar energy can not be used at night or during cloudy or stormy weather. Wind energy is also dependent on the weather as well as being inefficient. In contrast to solar and wind, the sea tides are highly regular, cycling once or twice each twenty-four hour period. Hence, using tidal energy to generate electricity is of great importance in power generator design.

DETAILED DESCRIPTION

Figure 1:
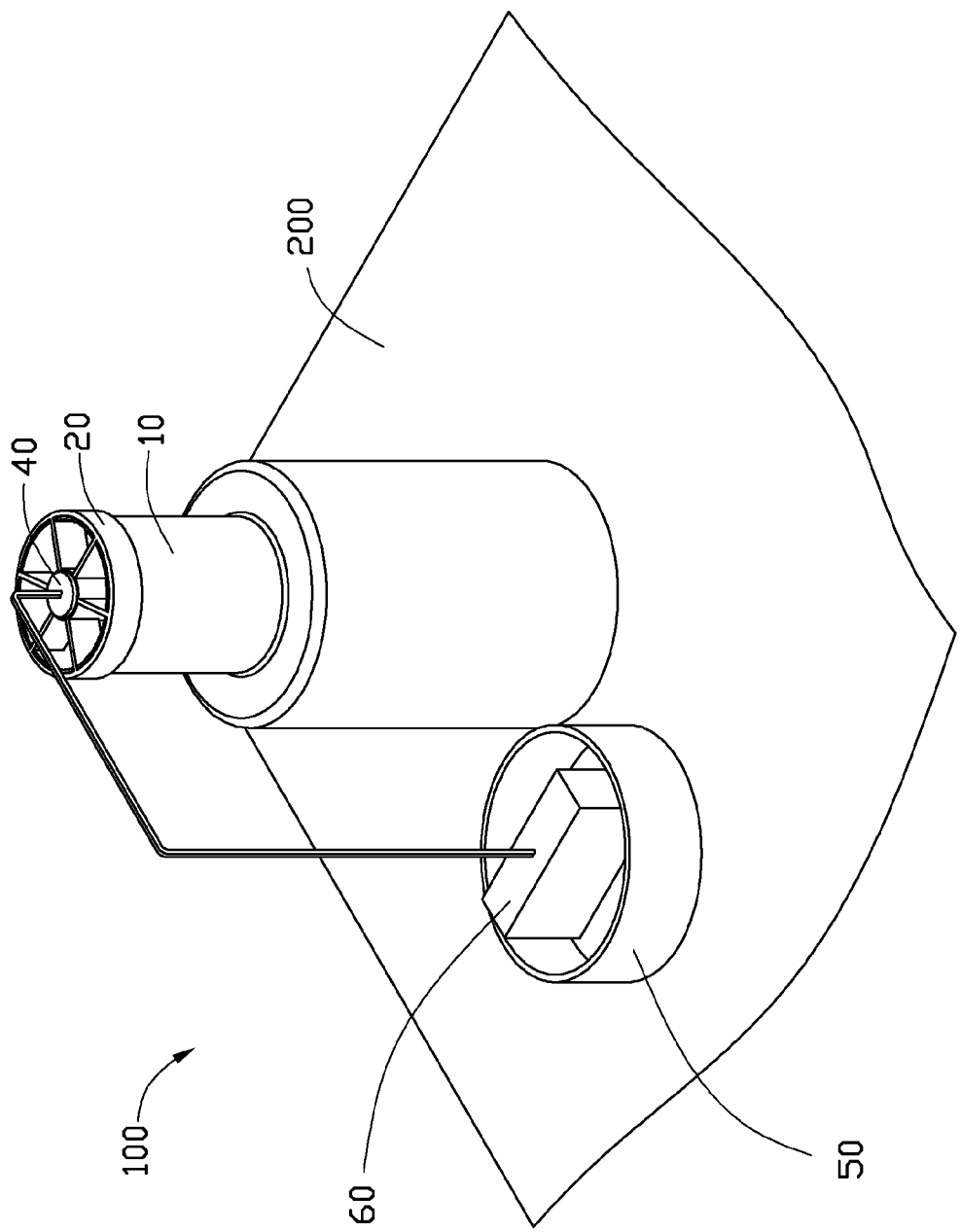
FIG. 1 is a schematic isometric view of a tidal power generator, according to an exemplary embodiment.
Figure 2:
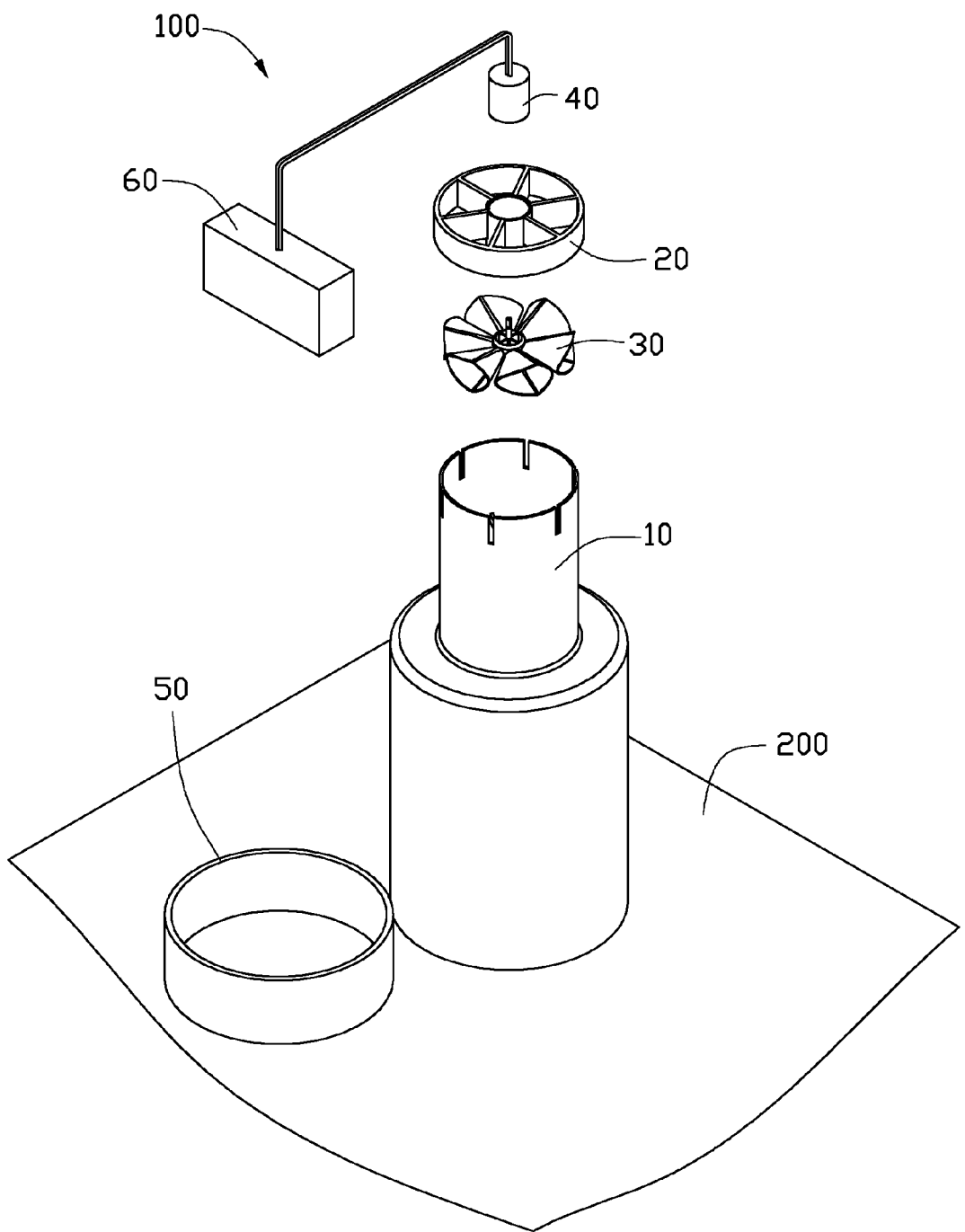
FIG. 2 is an exploded view of the tidal power generator of FIG. 1.

Referring to FIGS. 1-2, a tidal power generator 100, according to an exemplary embodiment, includes a hollow container 10, a sleeve 20, an impeller 30 designed for unidirectional rotation, an electric generator 40, a floating barrel 50, and a chargeable power source 60.

Figure 3:
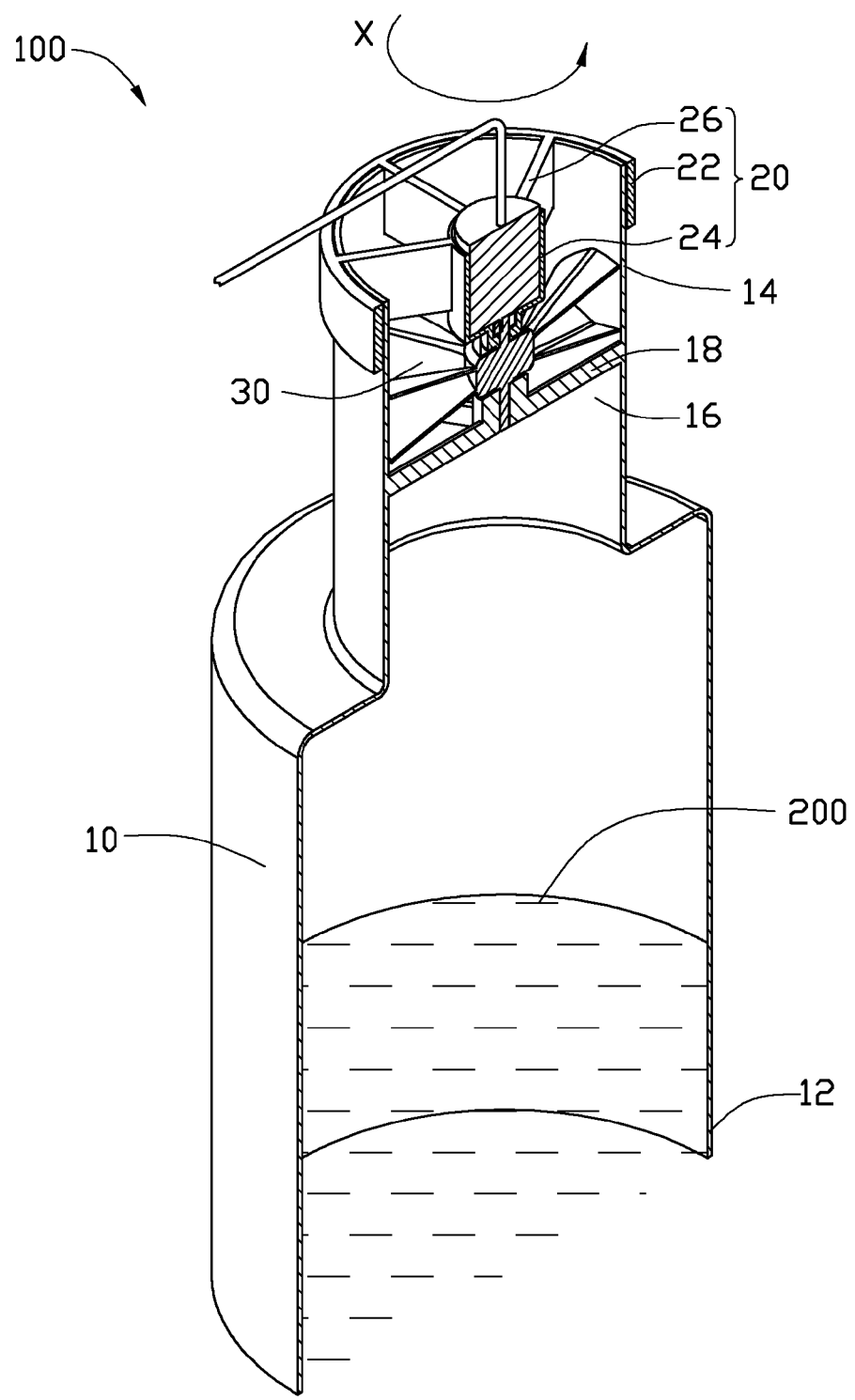
FIG. 3 is a partial, cut-away view of the tidal power generator of FIG. 1.
Figure 4:
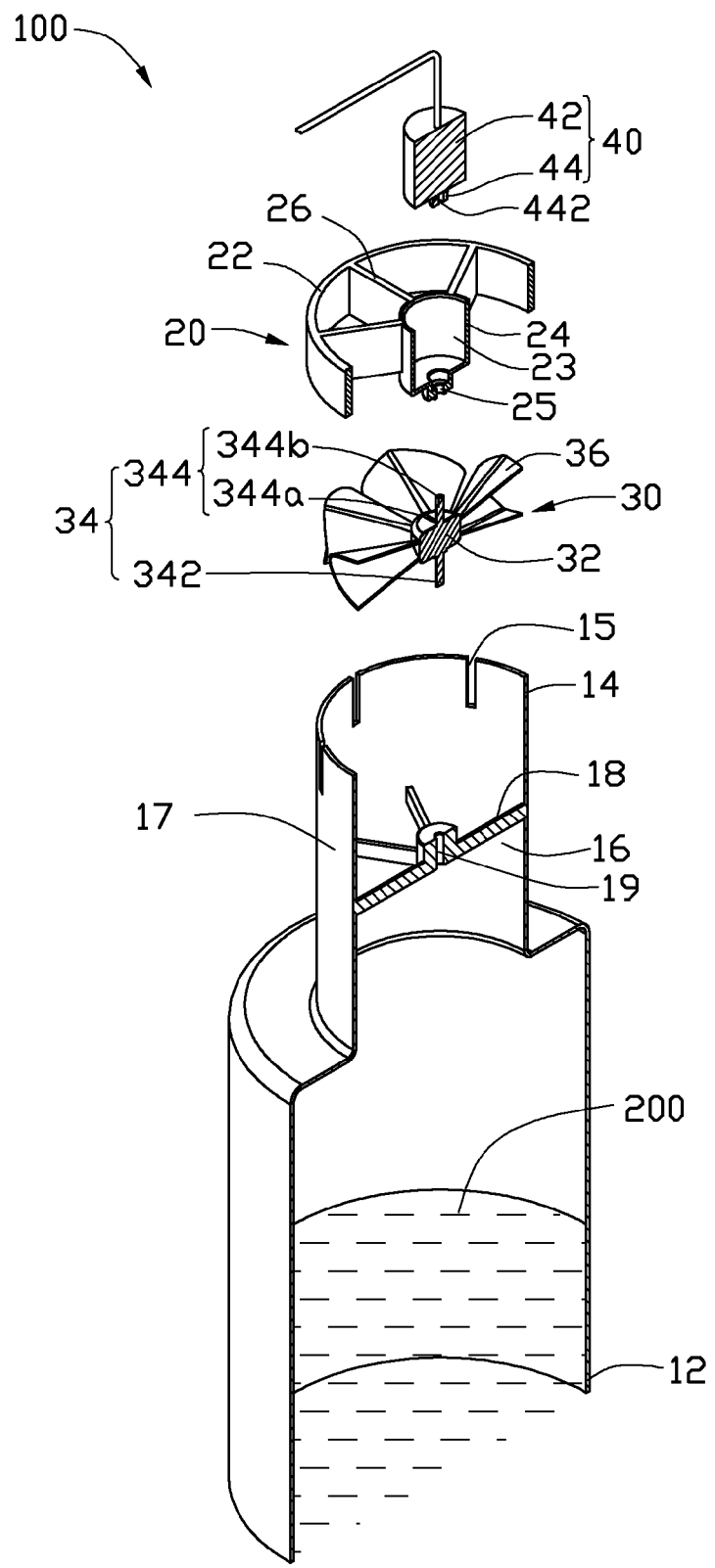
FIG. 4 is a partial, cut-away view of the tidal power generator of FIG. 2.

Referring to FIGS. 3-4, the container 10 is immerged in the sea. The container 10 defines a first opening 12 under the sea level 200 and an opposite second opening 14 above the sea level 200, and includes a supporting portion 18 with a spoke-like structure. Six evenly distributed cutouts 15 are defined in the sidewall of the container 10 adjacent to the second opening 14. The supporting portion 18 is adjacent to the second opening 14 and extends inwards from the inner wall 16 to the central axis of the container 10. A fixing hole 19 is defined through the center of the supporting portion 18.

The sleeve 20 includes a circular sidewall 22, a receiving portion 24 positioned in the center of the inner of the circular sidewall 22, and six connecting portions 26 connecting the receiving portion 24 to the circular sidewall 22. A receiving cavity 23 and a through hole 25 are defined in the receiving portion 24. The receiving cavity 23 is shaped to fittingly accommodate the electric generator 40. The through hole 25 communicates with the receiving cavity 23 and corresponds to the fixing hole 19. The six connecting portions 26 correspond to the six cutouts 15 around the circumference of the second opening 14. The six connecting portions 26 are engaged in the six cutouts 15 correspondingly and the circular sidewall 22 encircles the outer wall 17 of the container 10 so that the sleeve 20 is fixed to the container 10.

The impeller 30 is interposed between the sleeve 20 and the supporting portion 18. The impeller 30 is configured for rotating unidirectionally when the tide is rising and falling. The impeller 30 includes a cylinder body 32, a shaft 34 extending through the body 32, and six blades 36 radially extending from the body 32. The shaft 34 includes a first end 342 and an opposite second end 344 at opposite sides of the cylinder body 32. The first end 342 extends and inserts through the fixing hole 19. The second end 344 includes a cylindrical portion 344a and a semi-cylindrical portion 344b extending from the cylindrical portion 344a. The cylindrical portion 344a extends through the through hole 25.

The electric generator 40 is accommodated in the receiving cavity 23. The electric generator 40 includes a stator 42 and a rotor 44 extending from the stator 42. A connecting hole 442 is defined through the center of the rotor 44 and is shaped corresponding to the semi-cylindrical portion 344b. The semi-cylindrical portion 344b is engaged in the connecting hole 442 so that the impeller 30 is connected to the electric generator 40.

Referring to FIGS. 1-2, the floating barrel 50 floats on the sea outside the container 10. The power source 60 is a storage battery in this embodiment and received in the floating barrel 50. The power source 60 is electrically and mechanically connected to the electric generator 40. The floating barrel 50 is connected to the container 10 through the power source 60.

In an alternative exemplary embodiment, the power source 60 is not limited to be received in the floating barrel 50. The power source 60 may be supported on the supporting portion 18.

Referring to FIGS. 3-4, when the tide begins to flow, the impeller 30 is pushed to rotate along a direction X by air flow from the second opening 14. The rotor 44 rotates following the rotation of the impeller 30 so that the stator 42 outputs electrical energy to the power source 60. The power source 60 stores the electrical energy. When the tide begins to ebb, the impeller 30 is also pushed to rotate along the direction X by air flow from the first opening 12. The rotor 44 rotates with the rotation of the impeller 30 so that the stator 42 outputs electrical energy to the power source 60. As a result, the tidal energy can be converted to electrical energy, without producing harmful emissions. Also, the tide energy is inexhaustible and highly common so that the electrical energy generated by the tide energy is persistent and efficient.

It is to be understood, however, that even though numerous characteristics and advantages of the present embodiments have been positioned fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A tidal power generator comprising:
    a hollow container defining a first opening and an opposite second opening, and comprising a supporting portion, the supporting portion defining a fixing hole;
    an impeller designed for unidirectional rotation, the impeller being positioned at the second opening and configured for unidirectionally rotating pushed by air flow, wherein the impeller comprises a cylinder body, a shaft extending through the body and corresponding to the fixing hole, and a plurality of blades radially extending from the body; the shaft comprises a first end and an opposite second end at two opposite sides of the cylinder body;
    a sleeve fixed to the container at the second opening, wherein the sleeve defines a receiving cavity and a through hole corresponding to the fixing hole, the through hole is communicated with the receiving cavity, the impeller is interposed between the sleeve and the supporting portion, the first end of the shaft extends and inserts through the fixing hole, the second end of the shaft extends and inserts through the through hole;

an electric generator fixed in the receiving cavity and comprising a stator and a rotor extending from the stator, the rotor fixedly connected to the second end of the shaft of the impeller, the rotor rotating with rotation of the impeller so that the stator outputting electrical energy; and a chargeable power source configured for storing the output electrical energy.

2. The tidal power generator as claimed in claim 1, wherein the second end comprises a cylindrical portion and a semi-cylindrical portion extending from the cylindrical portion; a connecting hole is defined in the center of the rotor corresponding to the semi-cylindrical portion; the cylindrical portion extends and inserts through the through hole, and the semi-cylindrical portion is engaged in the connecting hole so that the impeller is connected to the electric generator.

3. The tidal power generator as claimed in claim 1, wherein a plurality of evenly distributed cutouts are defined in the sidewall of the container adjacent to the second opening; the sleeve comprises a circular sidewall, a receiving portion positioned in the center of the inner of the circular sidewall, and a plurality of connecting portions connecting the receiving portion to the circular sidewall; the connecting portions are engaged in the cutouts respectively and the circular sidewall encircles the outer wall of the container so that the sleeve is fixed to the container.

4. The tidal power generator as claimed in claim 1, wherein the supporting portion is a spoke-like structure.

5. The tidal power generator as claimed in claim 1, wherein the power source is a storage battery.

6. The tidal power generator as claimed in claim 1, wherein the tidal power generator further comprises a floating barrel, the floating barrel floats on the sea outside the container; the power source is received in the floating barrel, the power source is electrically and mechanically connected to the electric generator, the floating barrel is connected to the container through the power source.

7. The tidal power generator as claimed in claim 1, wherein the power source is supported on the supporting portion.

\* \* \* \* \*